US011917670B2

(12) United States Patent
Ram et al.

(10) Patent No.: US 11,917,670 B2
(45) Date of Patent: *Feb. 27, 2024

(54) PHYSICAL LAYER PROTOCOL DATA UNIT DIRECTIONAL TRANSMISSION

(71) Applicant: Marvell Asia Pte Ltd, Singapore (SG)

(72) Inventors: B Hari Ram, Chennai (IN); Vijay Ahirwar, Pune (IN); Sri Varsha Rottela, Visakhapatnam (IN); Nilesh N. Khude, Pune (IN); Sudhir Srinivasa, Los Gatos, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,449

(22) Filed: Dec. 30, 2021

(65) Prior Publication Data
US 2022/0124727 A1 Apr. 21, 2022

Related U.S. Application Data

(63) Continuation of application No. 16/706,073, filed on Dec. 6, 2019, now Pat. No. 11,229,035.
(Continued)

(51) Int. Cl.
*H04W 72/542* (2023.01)
*H04L 25/02* (2006.01)
(Continued)

(52) U.S. Cl.
CPC ....... *H04W 72/542* (2023.01); *H04L 25/0202* (2013.01); *H04W 24/04* (2013.01);
(Continued)

(58) Field of Classification Search
CPC .................................................. H04W 72/542
See application file for complete search history.

(56) References Cited

U.S. PATENT DOCUMENTS 9,166,660 B2   10/2015   Chu et al.
9,325,540 B2   4/2016    Zhang et al.
(Continued)

FOREIGN PATENT DOCUMENTS

WO   WO-2009/110161 A1   9/2009
WO   WO-2014/116811 A1   7/2014
WO   WO-2016/040837 A1   3/2016

OTHER PUBLICATIONS

IEEE P802.11ax™M/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

(Continued)

*Primary Examiner* — Jason E Mattis

(57) ABSTRACT

A first communication device in a first WLAN determines a channel estimate of a communication channel between the first communication device and a second communication device in a second WLAN using measurements at the first communication device of a first transmission between the second communication device and a third communication device in the second WLAN. The first communication device generates a PPDU for transmission to a fourth communication device in the first WLAN, including: determining, using the channel estimate, a precoder matrix to use for transmitting the PPDU in the first WLAN, and generating the PPDU using the precoder matrix so that interference at the second communication device in the second WLAN caused by transmission of the PPDU by the first communication device in the first WLAN is reduced. The first communication device transmits the PPDU to the fourth (Continued)

communication device in the first WLAN as a directional second transmission.

22 Claims, 7 Drawing Sheets

Related U.S. Application Data

(60) Provisional application No. 62/778,602, filed on Dec. 12, 2018.

(51) Int. Cl.
  *H04W 24/04* (2009.01)
  *H04W 24/08* (2009.01)
  *H04W 72/541* (2023.01)
  *H04W 84/12* (2009.01)

(52) U.S. Cl.
  CPC ......... *H04W 24/08* (2013.01); *H04W 72/541* (2023.01); *H04W 84/12* (2013.01)

(56) References Cited

U.S. PATENT DOCUMENTS

| | | | |
|---|---|---|---|
| 10,320,459 | B2 | 6/2019 | Zhang et al. |
| 11,229,035 | B2* | 1/2022 | Ram .................. H04W 72/541 |
| 2006/0291544 | A1 | 12/2006 | Fischer et al. |
| 2011/0261708 | A1 | 10/2011 | Grandhi |
| 2015/0333808 | A1* | 11/2015 | Onodera ................ H04B 7/024 370/329 |
| 2017/0303314 | A1 | 10/2017 | Cariou et al. |
| 2018/0115381 | A1 | 4/2018 | Lincoln et al. |
| 2019/0021092 | A1 | 1/2019 | Fakoorian et al. |
| 2020/0162135 | A1 | 5/2020 | Sun et al. |
| 2020/0343960 | A1 | 10/2020 | Li |

OTHER PUBLICATIONS

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std P802.11-REVmc™M/D8.0, (Revision of IEEE Std 802.11TM-2012), "Draft Standard for Information Technology—Telecommunications and information exchange between systems—Local and metropolitan area networks—Specific requirements," Part 11: Wireless LAN Medium Access Control (MAC) and Physical Layer (PHY) Specifications, *The Institute of Electrical and Electronics Engineers, Inc.*, 3775 pages (Aug. 2016).

International Search Report and Written Opinion in International Patent Application No. PCT/IB2019/060536, dated Feb. 24, 2020 (10 pages).

* cited by examiner

PHYSICAL LAYER PROTOCOL DATA UNIT DIRECTIONAL TRANSMISSION

CROSS REFERENCES TO RELATED APPLICATIONS

This application is a continuation of U.S. patent application Ser. No. 16/706,073 (now U.S. Pat. No. 11,229,035), entitled "Physical Layer Protocol Data Unit Directional Transmission," filed on Dec. 6, 2019, which claims the benefit of U.S. Provisional Patent Application No. 62/778,602, entitled "Sector Based Association of STA with AP," filed on Dec. 12, 2018. Both of the applications referenced above are hereby incorporated herein by reference in their entireties for all purposes.

FIELD OF TECHNOLOGY

The present disclosure relates generally to wireless communication systems, and more particularly to concurrent transmissions in different sectors.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range. In some scenarios where access points are located near each other, their respective service coverage areas spatially overlap and concurrent transmissions from, or to, the access points may interfere with each other. This interference prevents a second transmission from being started by one access point once a first transmission has been started by the other access point, until the first transmission has completed.

SUMMARY

In an embodiment, a method for transmitting a physical layer (PHY) protocol data unit (PPDU) in a first wireless local area network (WLAN) includes: determining, at a first communication device in the first WLAN, a channel estimate of a communication channel between the first communication device and a second communication device in a second WLAN using measurements at the first communication device of a first transmission between the second communication device and a third communication device in the second WLAN; generating, at the first communication device, the PPDU for transmission to a fourth communication device in the first WLAN, including: determining, using the channel estimate of the communication channel between the first communication device in the first WLAN and the second communication device in the second WLAN, a precoder matrix to use for transmitting the PPDU in the first WLAN, and generating the PPDU using the precoder matrix so that interference at the second communication device in the second WLAN caused by transmission of the PPDU by the first communication device in the first WLAN is reduced. The method also includes transmitting, at the first communication device, the PPDU to the fourth communication device in the first WLAN as a directional second transmission.

In another embodiment, a first wireless communication device for communicating in a first WLAN comprises a wireless network interface. The wireless network interfaces comprises circuitry configured to: determine a channel estimate of a communication channel between the first wireless communication device and a second wireless communication device in a second WLAN using measurements at the first wireless communication device of a first transmission between the second wireless communication device and a third wireless communication device in the second WLAN; and generate a PPDU for transmission to a fourth wireless communication device in the first WLAN, including: determining, using the channel estimate of the communication channel between the first wireless communication device in the first WLAN and the second wireless communication device in the second WLAN, a precoder matrix to use for transmitting the PPDU in the first WLAN, and generating the PPDU using the precoder matrix so that interference at the second wireless communication device in the second WLAN caused by transmission of the PPDU by the first wireless communication device in the first WLAN is reduced. The circuitry is further configured to control the wireless network interface to transmit the PPDU to the fourth wireless communication device in the first WLAN as a directional second transmission.

DETAILED DESCRIPTION

In various embodiments described below, a first access point is configured to transmit (or receive) a physical layer (PHY) protocol data unit (PPDU) while another transmission is ongoing. In some embodiments and/or scenarios, the other transmission is between a second access point that has a service coverage area that overlaps with a service coverage area of the first access point. In other embodiments and/or scenarios, the other transmission is from, or to, the first access point. The first access point is configured to identify one or more sectors within its service coverage area that are busy with the other transmission. The access point selects a second communication device (e.g., a client station associated with the access point) to receive the PPDU (or to transmit the PPDU) using the one or more busy sectors. In an embodiment, for example, the access point selects the second communication device so that the busy sectors are avoided during the transmission of the PPDU. In another embodiment, for example, the access point selects the second communication device so that co-channel interference with the second access point is reduced. The access point transmits the PPDU as a second, directional transmission, for example, towards a sector in which the selected second communication device is located. In various embodiments, the directional transmission is performed using one or more of directional antennas, semi-directional antennas, and phased arrays.

Figure 1:
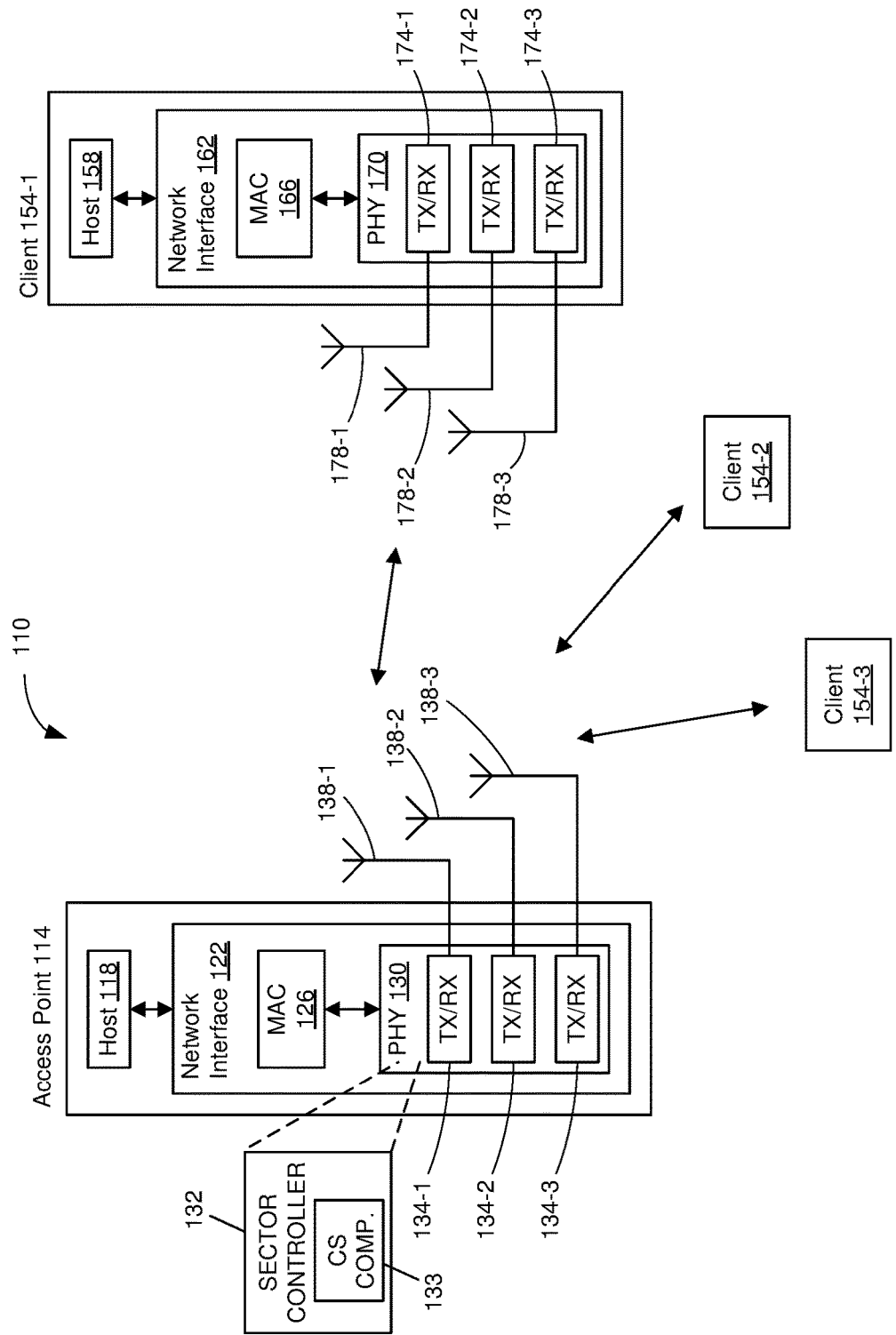
FIG. 1 is a block diagram of an example wireless local area network (WLAN) having a first access point configured to transmit or receive a physical layer (PHY) protocol data unit (PPDU) while another transmission is ongoing, according to an embodiment.

FIG. 1 is a block diagram of an example wireless local area network (WLAN) 110 configured to utilize sectors within a service coverage area, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a sector controller 132 and a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

Figure 2:
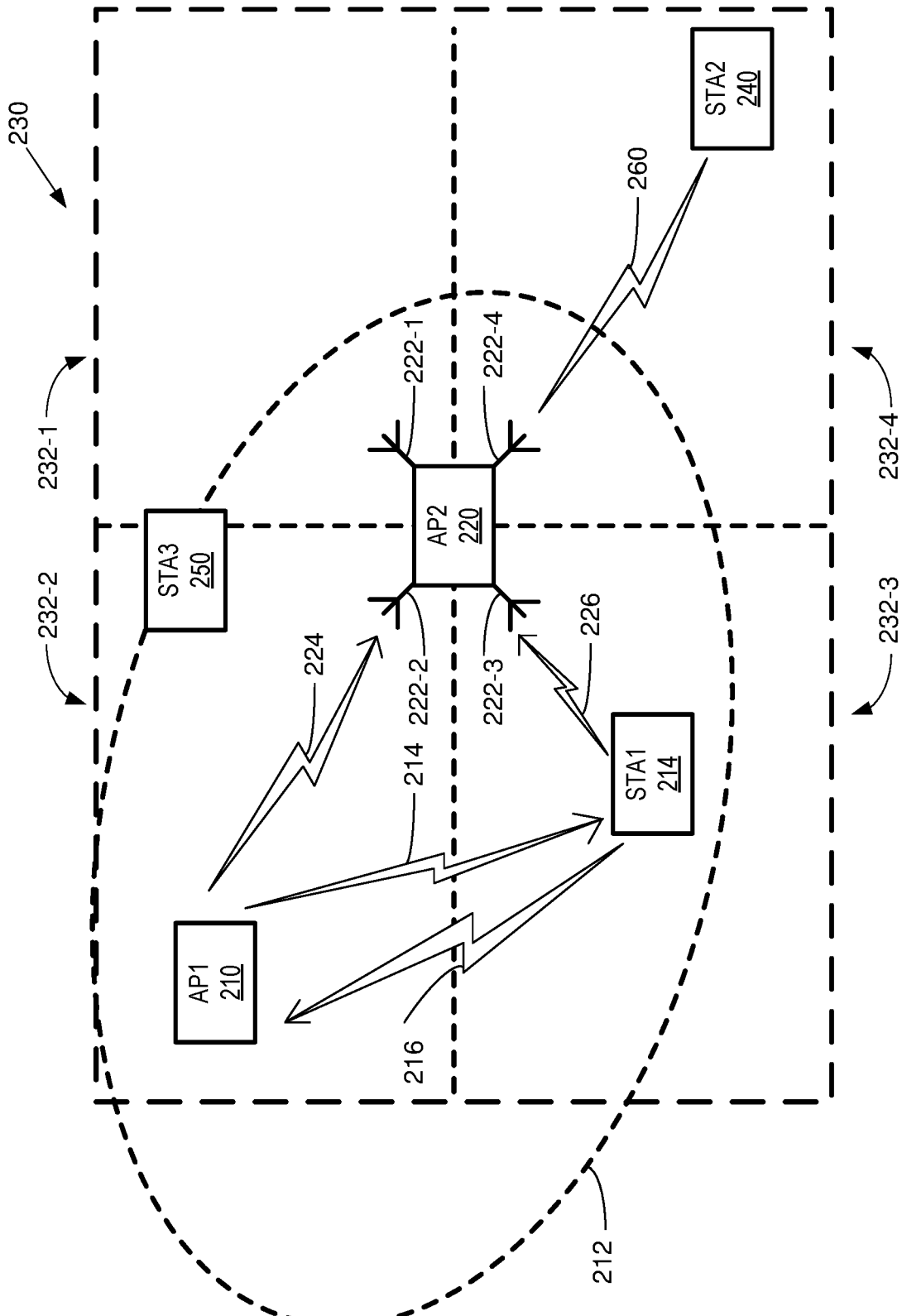
FIG. 2 is a diagram of an example access point of FIG. 1 configured to provide a first service coverage area that overlaps with a second service coverage area of a second access point, according to an embodiment.

In various embodiments, the AP 114 is configured to provide service for the WLAN 110 (e.g., for a basic service set) within a service coverage area, for example, service coverage area 230 (FIG. 2). In some embodiments, the AP 114 includes at least some directional antennas (e.g., parabolic antenna, grid antenna) and/or or semi-directional antennas (e.g., patch/panel antenna, Yagi antenna) that are configured to transmit and/or receive signals in a portion of a service coverage area provided by the AP 114. In some embodiments, the AP 114 includes at least some antennas configured as a phased array. In still other embodiments, the AP 114 includes one or more of omnidirectional antennas, semi-directional antennas, directional antennas, and phased array antennas. In various embodiments, the AP 114 is configured to divide its service coverage area into a plurality of sectors and to assign ones of the antennas 138 to ones of the plurality of sectors.

The network interface device 122 is implemented using one or more integrated circuits (ICs) configured to operate as discussed below. For example, the MAC processor 126 is implemented, at least partially, on a first IC, and the PHY processor 130 is implemented, at least partially, on a second IC, in various embodiments. As another example, at least a portion of the MAC processor 126 and at least a portion of the PHY processor 130 are implemented on a single IC. For instance, the network interface device 122 is implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random-access memory (RAM), a read-only memory (ROM), a flash memory, etc. In an embodiment, the host processor 118 is implemented, at least partially, on a first IC, and the network interface device 122 is implemented, at least partially, on a second IC, in various embodiments. As another example, the host processor 118 and at least a portion of the network interface device 122 is implemented on a single IC.

The network interface device 122 is configured to generate and transmit different PHY protocol data units (PPDUs), in various embodiments and/or scenarios. In some embodiments, the network interface device 122 transmits different PPDUs concurrently using different antennas. In some embodiments, for example, the network interface device 122 is configured to transmitting a first PPDU as a directional transmission during another transmission, as described herein.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130. The PHY processor 130 is configured to receive MAC layer data units from the MAC processor 126 and encapsulate the MAC layer data units to generate PHY data units such as PHY protocol data units (PPDUs) for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets," and MAC layer data units are sometimes referred to herein as "frames."

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc., to provide at least some of the functionality described herein. In another embodiment, the MAC processor 126 includes a hardware state machine that provides at least some of the functionality described herein.

The sector controller 132 is configured to divide the service coverage area into the plurality of sectors and assign ones of the antennas 138 to ones of the plurality of sectors, in various embodiments. In an embodiment, the sector controller 132 includes, or is communicatively coupled with, one or more carrier sense components 133 (or energy detector components) configured to determine whether a WLAN communication channel is busy or idle, for example, by measuring a signal strength within the WLAN communication channel. In an embodiment, ones of the carrier sense components 133 are configured to measure the signal strength in particular sectors or directions. Although the sector controller 132 is shown as part of the PHY processor 130, the sector controller 132 is a separate controller or processor within the network interface 122, in other embodiments. In some embodiments, the carrier sense components 133 are included within the transceivers 134, instead of within the sector controller 132.

In an embodiment, the MAC processor 126 and the PHY processor 130 are configured to operate according to a first WLAN communication protocol (e.g., an IEEE 802.11be Standard, or extremely high throughput (EHT)), and also according to one or more second WLAN communication protocols (e.g., as defined by one or more of the IEEE 802.11n Standard, IEEE 802.11ac Standard, the IEEE 802.11ax Standard and/or other suitable WLAN communication protocols) that are legacy protocols with respect to the first WLAN communication protocol. The one or more second WLAN communication protocols are sometimes collectively referred to herein as a "legacy WLAN communication protocol" or simply "legacy protocol."

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154 includes other suitable numbers (e.g., 1, 2, 4, 5, etc.) of transceivers 174 and antennas 178 in other embodiments. In some embodiments, the client station 154 includes a higher number of antennas 178 than transceivers 174, and antenna switching techniques are utilized. In some embodiments, one or more of the network interface devices 162, the MAC processor 166, and the PHY processor 170 are configured similarly to the network interface device 122, the MAC processor 126, and the PHY processor 130, respectively.

The network interface device 162 is implemented using one or more ICs configured to operate as discussed below. For example, the MAC processor 166 is implemented on at least a first IC, and the PHY processor 170 is implemented on at least a second IC, in various embodiments. As another example, at least a portion of the MAC processor 166 and at least a portion of the PHY processor 170 is implemented on a single IC. For instance, the network interface device 162 is implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 is implemented, at least partially, on a first IC, and the network device 162 is implemented, at least partially, on a second IC, in various embodiments. As another example, the host processor 158 and at least a portion of the network interface device 162 is implemented on a single IC.

In various embodiments, the MAC processor 166 and the PHY processor 170 of the client device 154 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170. The PHY processor 170 is configured to receive MAC layer data units from the MAC processor 166 and encapsulate the MAC layer data units to generate PHY data units such as PPDUs for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units. In some embodiments, for example, the MAC processor 166 is configured similarly to the MAC processor 126. In an embodiment, for example, the MAC processor 166 includes multiple instances of the multi-band backoff timers 127.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. to provide at least some of the functionality described herein. In an embodiment, the MAC processor 166 includes a hardware state machine that provides at least some of the functionality described herein.

In an embodiment, the MAC processor 166 and the PHY processor 170 are configured to operate according to the first WLAN communication protocol, and also according to the legacy WLAN communication protocol.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, one or both of the client stations 154-2 and 154-3 are configured to operate according to the legacy WLAN communication protocol, but not according to the first WLAN communication protocol. Such client stations are referred to herein as "legacy client stations." Similarly, an access point that is similar to the AP 114 and is configured to operate according to the legacy WLAN communication protocol, but not according to the first WLAN communication protocol, is referred to herein as a "legacy AP." More generally, wireless communication devices that are configured to operate according to the legacy WLAN communication protocol, but not according to the first WLAN communication protocol, are referred to herein as a "legacy communication devices."

FIG. 2 is a diagram of an example access point (AP) 220 configured to provide a service coverage area 230 that overlaps with a service coverage area 212 of another AP 210, according to an embodiment. The AP 220 is referred to herein as a "second AP" and generally corresponds to the access point 114 of FIG. 1, in an embodiment. The access point 210 is referred to herein as a "first AP" and corresponds to the access point 114 of FIG. 1, or another suitable communication device. In some embodiments, the first AP 210 is a "legacy" access point that does not provide sector-based features (e.g., directional transmissions to sectors).

The second AP 220 includes a plurality of antennas 222 configured for directional transmissions to sectors while another transmission is ongoing. In the embodiment shown in FIG. 2, the second AP 220 comprises four directional antennas 222-1, 222-2, 222-3, and 222-4 configured to send and receive in different sectors 232-1, 232-2, 232-3, and 232-4, respectively. In some embodiments, the antennas 222 generally correspond to antennas 138 of the AP 114 in FIG. 1. Although four directional antennas are shown, in other embodiments, the AP 220 has a different configuration of antennas, for example, sixteen omnidirectional antennas configured as four separate phased arrays having four antennas each. In an embodiment, the plurality of antennas 222 are configured to form a plurality far field radiation sectors or antenna patterns that are substantially non-overlapping.

The second AP 220 includes a sector controller (e.g., sector controller 132) configured to divide the service coverage area 230 into a plurality of sectors, for example, sectors 232-1, 232-2, 232-3, and 232-4, and to assign ones of the antennas 222 to the different sectors. The second AP 220 is configured to perform directional transmissions to client stations according to a sector in which the client stations are located, in various embodiments. In some scenarios, the directional transmission reduces co-channel interference with other communication devices, for example, the AP 210 or a client station 214, even when the other communication devices are performing a first transmission using same WLAN radio resources (i.e., same channel bandwidth).

The service coverage area 230 is a geographical area covered by the second AP 220, in an embodiment. In other words, the service coverage area 230 is an area in which a client station is able to authenticate and associate with the second AP 220. In the embodiment shown in FIG. 2, the sectors 232 are illustrated as non-overlapping with each other and generally rectangular in shape for ease of description; however, respective sizes and shapes of the sectors 232 are variable and may depend, for example, on environmental factors such as walls, furniture, objects or people moving throughout the service coverage area 230, or other factors. In some embodiments, the size and shape of the sectors 232 depends upon an orientation of one or more corresponding antennas. In some embodiments, the sector controller 132 determines the sectors 232 such that at least some of the sectors partially spatially overlap, for example, at boundaries between adjacent sectors. In some scenarios, overlapping the boundaries reduces the likelihood of a client station being within a "dead zone" having reduced received signal strength from the second AP 220.

In the embodiment shown in FIG. 2, the first AP 210 provides a service coverage area 212 that at least partially spatially overlaps the service coverage area 230 of the second AP 220. In various embodiments and/or scenarios, the first AP 210 performs a first transmission 214 of a PPDU (e.g., a data frame) to the client station 214 (STA1) and the client station 214 performs a second transmission 216 of a PPDU (e.g., an acknowledgment to the data frame) to the first AP 210. The first transmission 214 and the second transmission 216 cause interference 224 and 226, respectively, at the second AP 220; however, the interference 224 and 226 are generally located within the sectors 232-2 and 232-3, while other sectors are not affected or less affected (e.g., sectors 232-1 and 232-4).

The second AP 220 is configured to identify one or more sectors of the service coverage area 232 that are busy, for example, busy with the first transmission 214 and/or the second transmission 216, in various embodiments. In an embodiment, the sector controller 132 of the second AP 220 uses the carrier sense component 133 to identify particular sectors that are busy. By using sectorization, the second AP 220 is configured to consider each sector of the service coverage area 230 as a separate carrier sense opportunity so that when a signal is received in a first sector (e.g., from a client station or another access point), another sector can be used by the AP 220 for a different transmission. In the embodiment shown in FIG. 2, the carrier sense component 133 identifies the sector 232-2 and the sector 232-3 as busy, based on the received interference 224 and 226.

The second AP 220 is configured to select another communication device associated with the AP 220, for example, among the client stations 240 and 250, to receive a PPDU during a directional transmission that at least partially temporally overlaps a duration of an ongoing transmission (i.e., the transmissions 214 and/or 216). The second AP 220 selects the other communication device using the identification of the one or more busy sectors, for example, to avoid transmission in those busy sectors.

The second AP 220 is configured to maintain respective target lists of sectors of the service cover area 230 in which respective ones of communication devices associated with the second AP 220 are estimated to be located, in various embodiments. In the embodiment shown in FIG. 2, for example, the second AP 220 maintains i) a first target list for the client station 214 that includes the sector 232-3, ii) a second target list for the client station 240 that includes the sector 232-4, and iii) a third target list for the client station 250 that includes the sector 232-1 and the sector 232-2. In some embodiments, the second AP 220 includes both sectors 232-1 and 232-2 in the target list for the client station 250 because the location of the client station 250 is adjacent to both sectors. In some embodiments, for example, where sectors at least partially spatially overlap, the second AP 220 includes both sectors when the location of the client station 250 is within both sectors. Although only one or two sectors are included in the target lists in the description, the target lists include three, four, or more sectors in other embodiments, for example. In some embodiments, the second AP 220 provides the corresponding target list, or an indication thereof, to the client stations. In other embodiments, the second AP 220 maintains the target lists without sharing its contents with the client stations (for example, when the client stations do not explicitly support sectorization).

The second AP 220 estimates the sector in which the client station is located during an authorization and association procedure, in an embodiment. In an embodiment, for example, the second AP 220 transmits (e.g., broadcasts) a beacon frame and performs the location estimation based upon respective energy detectors associated with the antennas 222 when receiving a response to the beacon frame. In an embodiment, the second AP 220 broadcasts the beacon frame by transmitting the beacon frame by an omnidirectional antenna. In another embodiment, the second AP 220 broadcasts a copy of the beacon frame in each sector of the service coverage area 230. In some embodiments, the second AP 220 is configured to update the target list corresponding to a client station based on a reception of a PPDU having a non-null data portion (e.g., a data frame), for example, based on received signal strength of the PPDU at multiple antennas of the second AP 220.

In some scenarios, the second AP 220 performs the directional transmission concurrently with the ongoing transmission and thus improves overall efficiency of the WLAN communication channel. In the embodiment shown in FIG. 2, the second AP 220 selects the client station 240 instead of the client station 250 for a directional transmission 260 because the client station 250 is located within the busy sector 232-2, while the client station 240 is located in an "idle" sector 232-4 that is not busy. The second AP 220 generates a PPDU for the transmission to the client station 240 and transmits the PPDU to the client station 240 as a directional transmission that occurs during the first transmission (e.g., during transmission 214 and/or transmission 216).

In an embodiment, the second AP 220 includes sixteen or more antennas and divides the service coverage area 230 into sectors with overlapping antenna pattern for each sector, so that any geographical location within the service coverage area 230 is covered by two sectors. In some scenarios, the second AP 220 supports up to eight stream transmissions using the IEEE 802.11ax or IEEE 802.11ac protocol (which have a maximum number of spatial streams of eight) in each geographical location (i.e., using eight antenna pairs per location).

Figure 3:
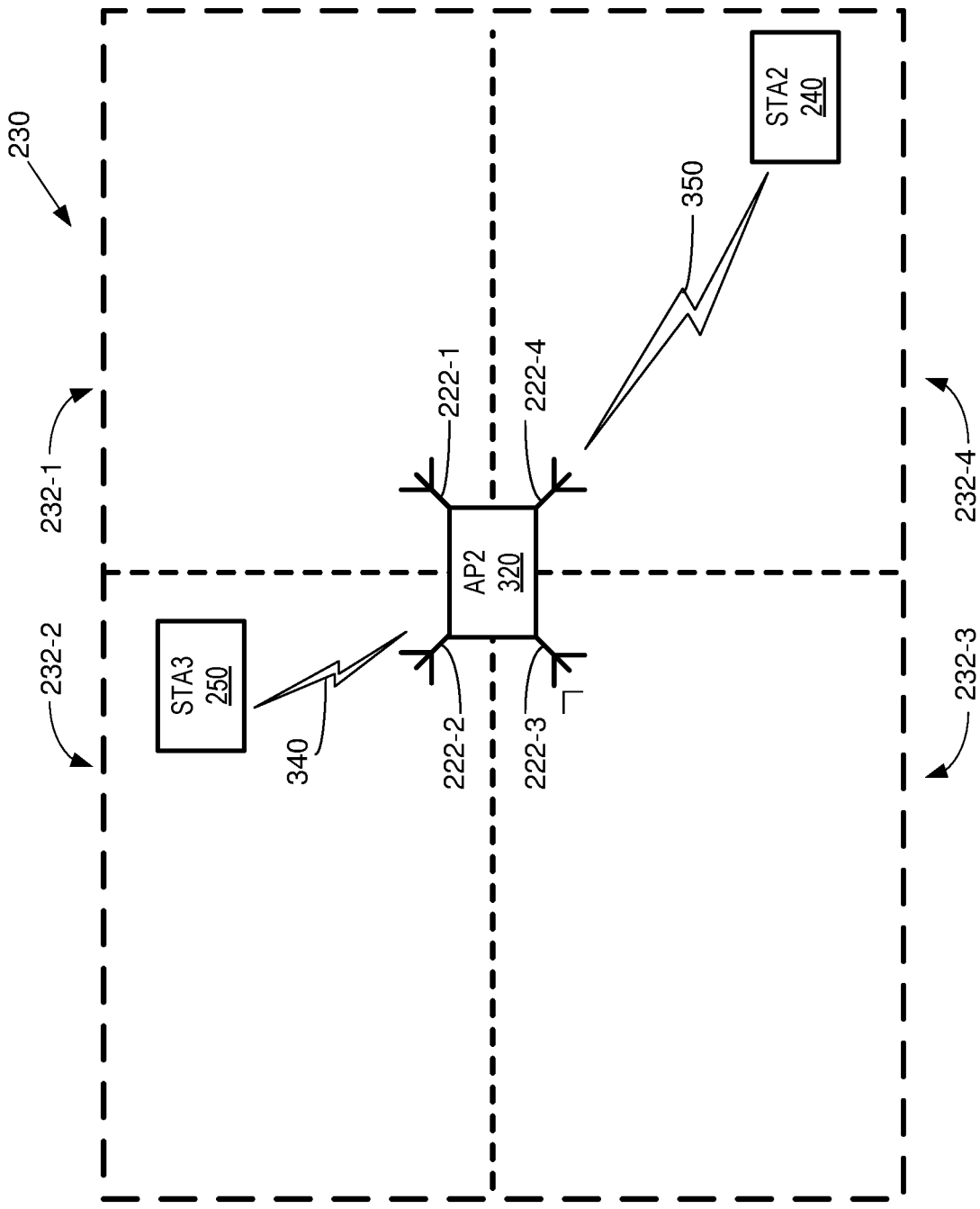
FIG. 3 is a diagram of an example access point of FIG. 1 configured for full duplex communication using directional transmissions, according to an embodiment.

FIG. 3 is a diagram of an example access point 320 configured for full duplex communication using directional transmissions, according to an embodiment. In other words, the access point 320 is configured to transmit and receive, concurrently, in different sectors. The access point 320 generally corresponds to the second AP 220, in some embodiments. In the embodiment shown in FIG. 3, the access point 320 performs a first, directional transmission 340 of a PPDU to the client station 250 in the sector 232-2 (i.e., using the antenna 222-2 assigned to the sector 232-2). The access point 320 identifies the sector 232-2 as busy while the first, directional transmission is ongoing. The access point 320 selects the client station 240 for a second transmission 350 using the identification of the one or more busy sectors (i.e., the sector 232-2 used by the first transmission 340). The second transmission 350 is from the client station 240, in an embodiment. In some embodiments, the first transmission 340 is a first single user transmission and the second transmission 350 is a second single user transmission. In other embodiments, the transmission 340 is from the client station 250 to the access point 320 and the transmission 350 is from the access point 320 to the client station 240.

In an embodiment, the access point 320 selects the client station 240 because it is located in the sector 232-4 that is furthest away from the busy sector 232-2. In another embodiment, the access point 320 has respective channel estimates corresponding to the WLAN communication channel between the access point 320 and its associated client stations. In this embodiment, the access point 320 selects the station that is expected to introduce less interference to the ongoing transmission 340.

Figure 4:
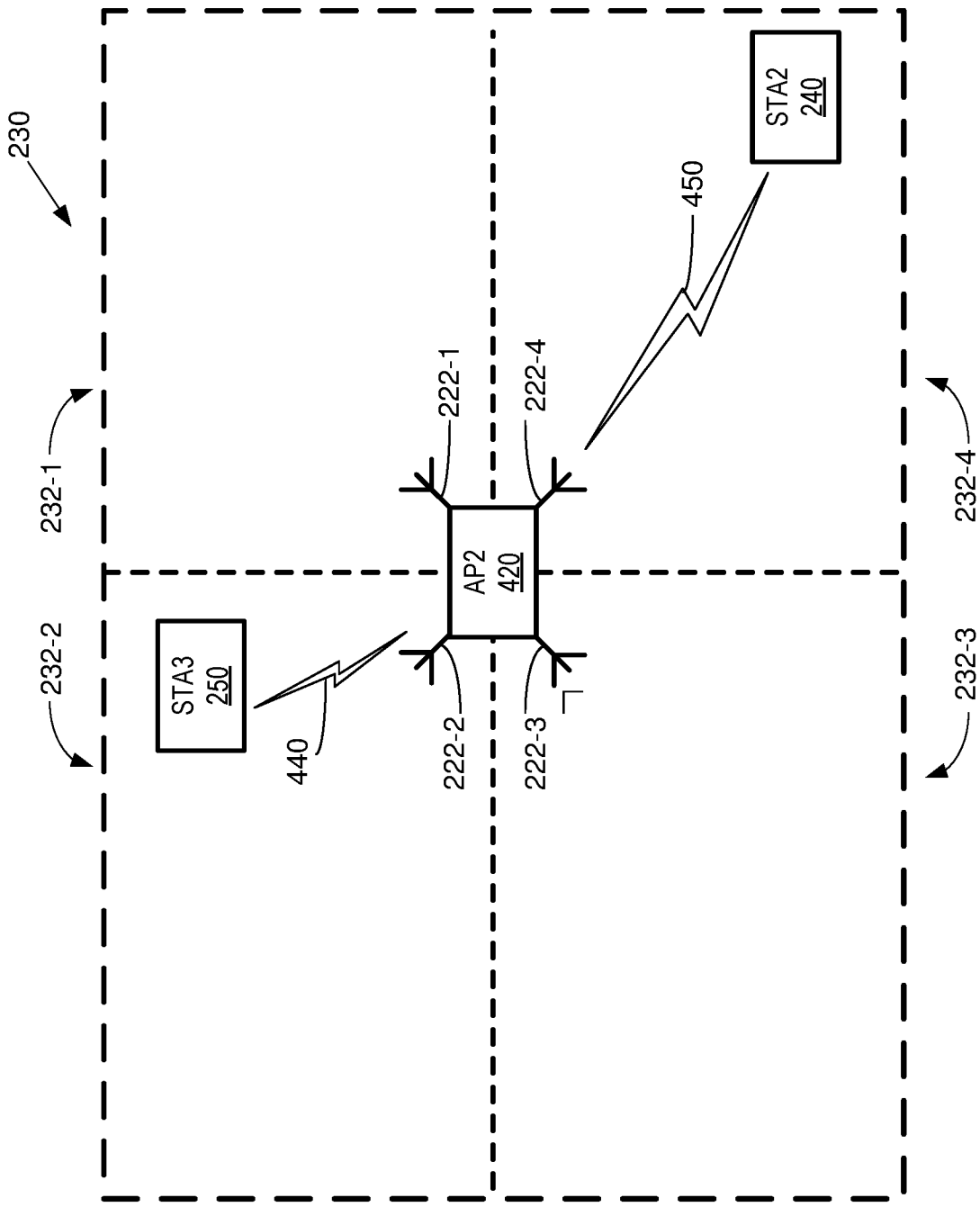
FIG. 4 is a diagram of an example access point of FIG. 1 configured for parallel communication using directional transmissions, according to an embodiment.

FIG. 4 is a diagram of an example access point 420 configured for parallel communication using directional transmissions, according to an embodiment. In other words, the access point 420 is configured to transmit, concurrently, in different sectors, or to receive, concurrently, in different sectors. The access point 420 generally corresponds to the second AP 220, in some embodiments. In the embodiment shown in FIG. 4, the access point 420 performs a first, directional transmission 440 of a PPDU to the client station 250 in the sector 232-2. The access point 420 identifies the sector 232-2 as busy while the first, directional transmission 440 is ongoing. The access point 420 selects the client station 240 for a second, directional transmission 450 using the identification of the one or more busy sectors (i.e., the sector 232-2 used by the first transmission 440). In some embodiments, the first transmission 440 is a first single user transmission and the second transmission 450 is a second single user transmission. In other words, the first transmission 440 and the second transmission 450 are not MU-MIMO transmissions because a steering matrix and corresponding null data packet exchange is not required. Instead, the first transmission 440 and the second transmission 450 are orthogonal to each other based on the directionality of the corresponding antennas. In other embodiments, the transmission 440 is from the client station 250 to the access point 420 and the transmission 450 is from the client station 240 to the access point 420.

Figure 5:
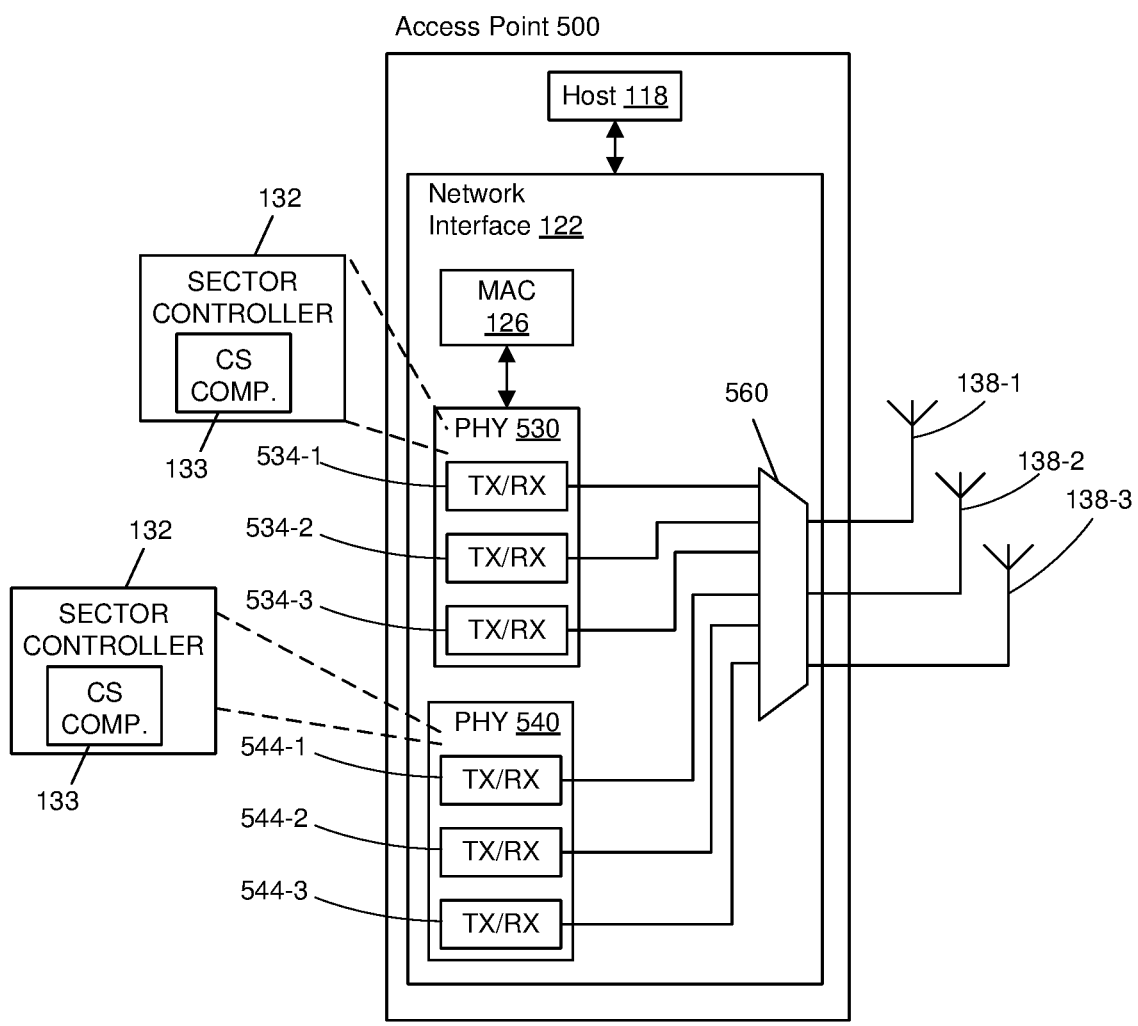
FIG. 5 is a block diagram of the access point of FIG. 4, in an embodiment.

FIG. 5 is a block diagram of an access point 500 configured for parallel transmission and/or parallel reception, in an embodiment. The access point 500 generally corresponds to the access point 114 of FIG. 1, but the network interface device 122 includes two or more PHY processors 530 and 540, instead of a single PHY processor 130. The PHY processors 530 and 540 generally correspond to the PHY processor 130 but share the same antennas 138 using a multiplexor 560 or other suitable processor to control access to the antennas (e.g., using a time-sharing algorithm). In this way, the access point 500 is equivalent to two separate access points having dynamically shared antennas (e.g., the antennas 138). In an embodiment, a receiver finite state machine (FSM) of the access point 500 is common up until an energy detection (ED) portion, with subsequent portions of the receiver FSM being partitioned into two portions (i.e., one portion for each of the parallel receptions).

Figure 6:
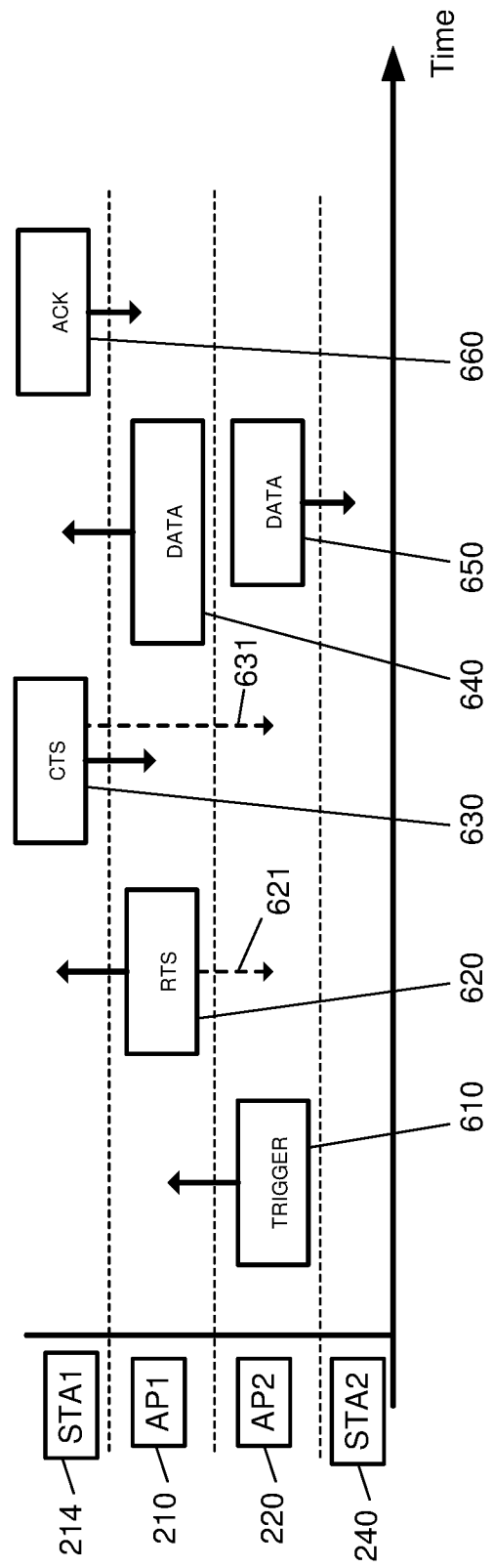
FIG. 6 is an example timing diagram for an access point of FIG. 1 configured to request a frame exchange for channel estimation, in an embodiment.

FIG. 6 is an example timing diagram 600 for the second AP 220, which is further configured to request a frame exchange for channel estimation, in an embodiment. The second AP 220 is configured to request the frame exchange as a form of cooperative communication with the first AP 210 to determine i) a first channel estimate of a WLAN communication channel between the second AP 220 and the first AP 210, and ii) a second channel estimate of the WLAN communication channel between the second AP 220 and the client station 214, using measurements at the second AP 220 of the frame exchange, in an embodiment. The frame exchange is between the first AP 210 and the client station 214, but the frame exchange is triggered or requested by the second AP 220. In the embodiment shown in FIG. 6, the frame exchange is a request-to-send/clear-to-send (RTS/CTS) frame exchange between the first AP 210 and the first client station 214.

The second AP 220 sends a request 610 to the first AP 210 to perform the RTS/CTS frame exchange, in some embodiments. The RTS/CTS frame exchange is configured for a full sounding, in other words, the frame exchange is configured so that i) an RTS frame 620 transmitted by the first AP 210 to the client station 214 includes a number of long training fields corresponding to a number of antennas of the first AP 210, and ii) a CTS frame 630 transmitted by the client station 214 to the first AP 210 includes a number of long training fields corresponding to a number of antennas of the client station 214. Although the RTS frame 620 and CTS frame 630 are not addressed to the second AP 220, the second AP 220 is configured to determine the first channel estimate using, at least in part, interference 621 from the RTS frame 620 and to determine the second channel estimate using, at least in part, interference 631 from the CTS frame 630.

Using the first and second channel estimates, the second AP 220 performs beamforming for a subsequent transmission so that interference with an ongoing transmission between the first AP 210 and the client station 214 is reduced, in various embodiments. In the embodiment shown in FIG. 6, the first AP 210 and the client station 214 perform a first transmission, for example, the first AP 210 transmits a data frame 640 to the client station 214. The second AP 220 determines a precoder matrix for a second transmission (e.g., a data frame 650) to the second client station 240 as a null space of the first channel estimate and the second channel estimate and generates the data frame 650 using the precoder matrix (e.g., a beamforming matrix).

As an example, where $V_{A1A2}$ is the channel estimate between the first AP 210 and the second AP 220, and $V_{S1A2}$ is the channel estimate between the client station 214 and the second AP 220, then a precoder matrix $Q=Null([V_{A1A2}\ V_{S1A2}])$, where $Null(A)$ is the Null space of the matrix A. When the precoder matrix Q is available, then there is no constraint on the transmission link between the second AP 220 and the client station 240, other than the maximum number of streams available for transmission, where the maximum number of streams is the rank of the precoder matrix Q.

In some scenarios, the precoder matrix Q based on both channel estimates does not exist. In an embodiment, when a rank of the precoder matrix Q is zero, the second AP 220 is configured to determine the precoder matrix Q as the Null space of the channel estimate that corresponds to the receiver of the other transmission (i.e., the receiver of the data frame 640: the client station 214). In other words, the second AP 220 attempts to null the data frame 650 only at the receiver of the first transmission. In this embodiment, the second AP 220 determines the precoder matrix $Q=Null(V_{S1A2})$. In this embodiment, where the second transmission is not nulled at the first AP 210, the WLAN communication channel should be free when the first AP 210 is sensing the channel for an acknowledgment (e.g., ACK 660). In an embodiment, the second AP 220 generates the data frame 650 to have an end time on or before an end time of the first transmission (e.g., an end of the data frame 640). In this embodiment, the data frame 650 does not interfere with the acknowledgment frame 660 of the data frame 640. In an embodiment, the second AP 220 determines a length of the first transmission 640 and generates the second transmission 650 to have a suitable length. In this embodiment, the second transmission of the data frame 650 is unprotected in that an immediate acknowledgment is not possible because it would collide with the acknowledgment 660.

In some embodiments, the second AP 220 requests a suitable frame exchange other than the RTS/CTS frame exchange. In an embodiment, for example, the second AP 220 sends a null data packet having a request for feedback for a multi-user transmission, where the multi-user client stations are the first AP 210, the client station 214, and the client station 240. In this embodiment, the second AP 220 determines i) a first channel estimate of the WLAN communication channel between the second AP 220 and the first AP 210, and ii) a second channel estimate of the WLAN communication channel between the second AP 220 and the client station 214, using measurements at the first AP 210 of a first null data packet transmitted from the second AP 220 to the first AP 210 and using measurements at the first client station 214 of a second null data frame transmitted from the second AP 220 to the first client station 214. In this embodiment, the first AP 210 is configured to respond to the first null data frame as a client station would be expected to respond, i.e., by performing a channel estimate and transmitting a feedback frame that indicates the channel estimate to the second AP 220.

Figure 7:
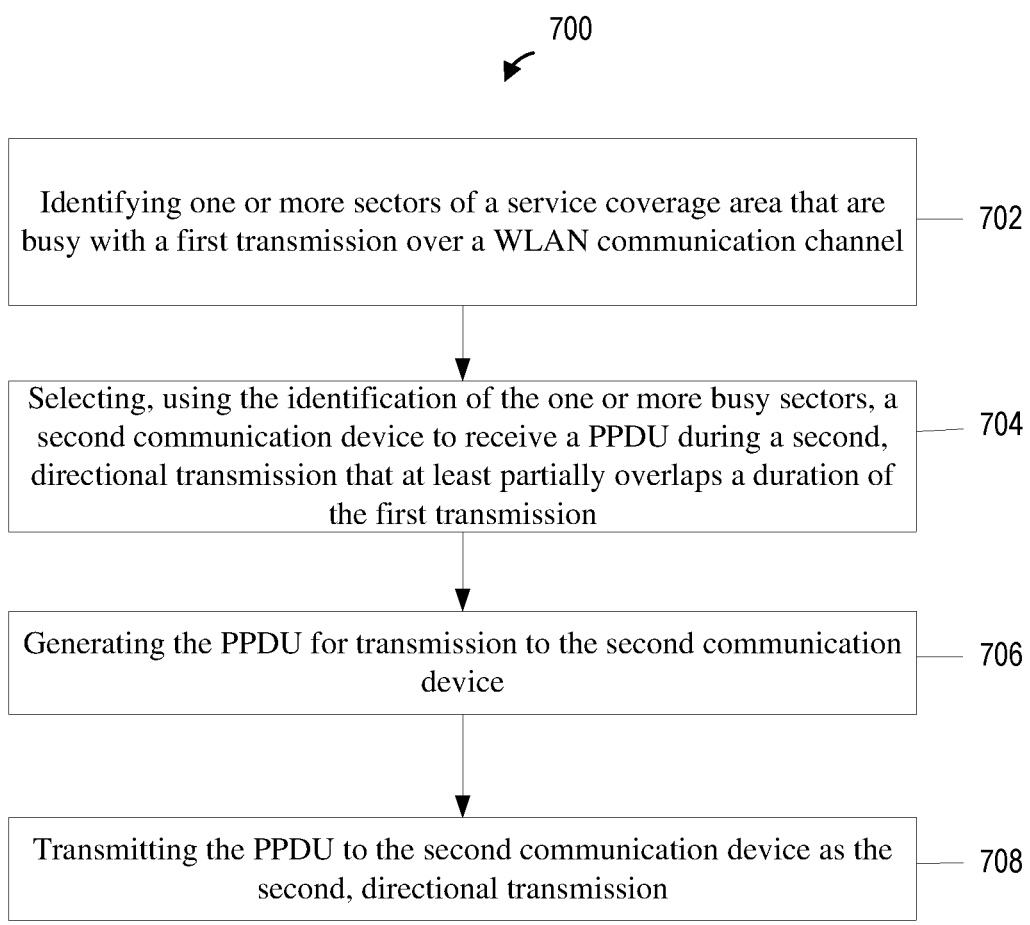
FIG. 7 is a flow diagram illustrating an example method for transmitting a PPDU, in an embodiment.

FIG. 7 is a flow diagram illustrating an example method 700 for transmitting a first physical layer (PHY) protocol data unit (PPDU) in a wireless local area network (WLAN) communication channel, in an embodiment. In an embodiment, the method 700 is implemented by an access point in the WLAN, according to an embodiment. With reference to FIG. 1, the method 700 is implemented by the network interface 122, in an embodiment. For example, in one such embodiment, the PHY processor 130 is configured to implement the method 700. According to another embodiment, the MAC processor 126 is also configured to implement at least a part of the method 700. With continued reference to FIG. 1, in yet another embodiment, the method 700 is implemented by the network interface 162 (e.g., the PHY processor 170 and/or the MAC processor 166). In other embodiments, the method 700 is implemented by other suitable network interfaces.

At block 702, one or more sectors of a service coverage area of the first communication device are identified, where the one or more identified sectors are busy with a first transmission over the WLAN communication channel, in an embodiment. In one embodiment, the one or more sectors correspond to the sectors 232-2 and 232-3 of FIG. 2. In another embodiment, the one or more sectors correspond to the sector 232-2 of FIG. 3. In yet another embodiment, the one or more sectors correspond to the sector 232-2 of FIG. 4. In some embodiments, the sector controller 132 of the network interface 122 (FIG. 1) identifies the busy sectors. In an embodiment, the carrier sense component 133 identifies the busy sectors.

At block 704, a second communication device is selected to receive the first PPDU during a second, directional transmission that at least partially temporally overlaps a duration of the first transmission using the identification of the one or more busy sectors, in an embodiment. In one embodiment, the second communication device is the client station 240 of FIG. 2. In another embodiment, the second communication device is the client station 240 of FIG. 3. In yet another embodiment, the second communication device is the client station 240 of FIG. 4. In some embodiments, the sector controller 132 selects the second communication device using the identification of the busy sectors from the carrier sense component 133.

At block 706, the first PPDU is generated for transmission to the second communication device, in an embodiment. In one embodiment, the first PPDU is the PPDU 260 of FIG. 2. In another embodiment, the first PPDU is the PPDU 350 of FIG. 3. In yet another embodiment, the PPDU is the PPDU 450 of FIG. 4.

At block 708, the first PPDU to the second communication device is transmitted as the second, directional transmission during the first transmission. In various embodiments, the second, directional transmission at least partially temporally overlaps the first transmission. In an embodiment, for example, the second, directional transmission begins during the first transmission and ends simultaneously with an end of the first transmission. In another embodiment, for example, the second, directional transmission begins during the first transmission and ends before the end of the first transmission. In some embodiments, the transceiver 134 generates and transmit the first PPDU.

Further aspects of the present invention relate to one or more of the following clauses.

In an embodiment, a method for transmitting a first physical layer (PHY) protocol data unit (PPDU) in a wireless local area network (WLAN) communication channel includes: identifying, at a first communication device, one or more sectors of a service coverage area of the first communication device that are busy with a first transmission over the WLAN communication channel; selecting, at the first communication device and using the identification of the one or more busy sectors, a second communication device to receive the first PPDU during a second, directional transmission that at least partially temporally overlaps a duration of the first transmission; generating, at the first communication device, the first PPDU for transmission to the second communication device; and transmitting, at the first communication device, the first PPDU to the second communication device as the second, directional transmission during the first transmission.

In other embodiments, the method includes any suitable combination of one or more of the following features.

The method further includes maintaining, at the first communication device, respective target lists of sectors of the service coverage area in which respective ones of communication devices associated with the first communication device are estimated to be located.

The first communication device has a plurality of antennas, ones of the plurality of antennas being configured to transmit in particular sectors of the service coverage area. Transmitting the first PPDU to the second communication device during the first transmission includes transmitting the first PPDU using antennas of the plurality of antennas that are configured to directionally transmit in sectors of the target list of sectors that corresponds to the second communication device.

Maintaining the respective target lists of sectors includes identifying, at the first communication device, sectors in which the second communication device is estimated to be located and storing the identified sectors in a target list that corresponds to the second communication device.

Maintaining the respective target lists of sectors includes updating the target list that corresponds to the second communication device based on a reception of a second PPDU having a non-null data portion.

Identifying the one or more sectors of the service coverage area of the first communication device that are busy includes identifying the one or more sectors as busy when the first transmission is between a third communication device and a fourth communication device.

The method further includes determining i) a first channel estimate of the WLAN communication channel between the first communication device and the third communication device, and ii) a second channel estimate of the WLAN communication channel between the first communication device and the fourth communication device, using measurements at the first communication device of a frame exchange between the third and fourth communication devices.

Determining the first channel estimate and the second channel estimate includes determining the first channel estimate and the second channel estimate using measurements at the first communication device of i) a request to send (RTS) frame transmitted by the third communication device to the fourth communication device, the RTS frame having a number of long training fields corresponding to a number of antennas of the third communication device, and ii) a clear to send (CTS) frame transmitted by the fourth communication device to the third communication device in response to the RTS frame, the CTS frame having a number of long training fields corresponding to a number of antennas of the fourth communication device.

The method further includes transmitting, by the first communication device, a request to the third communication device to perform the frame exchange between the third and fourth communication devices.

Generating the first PPDU includes: determining, at the first communication device, a precoder matrix for the second transmission as a null space of the first channel estimate and the second channel estimate; and generating the first PPDU using the precoder matrix.

Generating the first PPDU includes: determining, at the first communication device, a precoder matrix for the second transmission as a null space of a channel estimate that corresponds to a receiver of the first transmission; and generating the first PPDU using the precoder matrix.

Generating the first PPDU includes generating the first PPDU to have an end time on or before an end of the first transmission.

The method further includes determining i) a first channel estimate of the WLAN communication channel between the first communication device and the third communication device, and ii) a second channel estimate of the WLAN communication channel between the first communication device and the fourth communication device, using measurements at the third communication device of a first null data frame transmitted from the first communication device to the third communication device and using measurements at the fourth communication device of a second null data packet transmitted from the first communication device to the fourth communication device, wherein the first communication device and one of the third and fourth communication devices are access points.

Identifying the one or more sectors that are busy includes identifying a sector as busy when the first transmission is from the first communication device to a third communication device that is located in the sector.

The first transmission is a first single user transmission and transmitting the first PPDU to the second communication device is a second single user transmission.

Identifying the one or more sectors that are busy includes identifying a sector as busy when the first communication device is receiving the first transmission from a third communication device that is located in the sector.

The first communication device includes a directional antenna configured for transmission to a sector in which the second communication device is located and transmitting the first PPDU to the second communication device includes transmitting the first PPDU using the directional antenna.

The first communication device includes a plurality of antennas configured for a single user beamforming transmission to a sector in which the second communication device is located and transmitting the first PPDU to the second communication device includes transmitting the first PPDU as a single user beamforming transmission using the plurality of antennas.

The method further includes dividing, at the first communication device, the service coverage area into a plurality of sectors. Identifying the one or more sectors that are busy includes performing a separate carrier sense procedure for each sector of the plurality of sectors.

The first communication device includes a plurality of antennas, and the method further includes assigning ones of the antennas to ones of the plurality of sectors.

In another embodiment, an apparatus for transmitting a first PPDU in a WLAN communication channel includes a network interface device having one or more integrated circuits. The one or more integrated circuits include a sector controller configured to identify one or more sectors of a service coverage area of a first communication device that are busy with a first transmission over the WLAN communication channel. The sector controller is further configured to select, using the identification of the one or more busy sectors, a second communication device to receive the first PPDU during a second, directional transmission that at least partially temporally overlaps a duration of the first transmission. The one or more integrated circuits are configured to generate the first PPDU for transmission to the second communication device. The one or more integrated circuits are configured to transmit the first PPDU to the second communication device as the second, directional transmission during the first transmission.

In other embodiments, the apparatus includes any suitable combination of one or more of the following features.

The one or more integrated circuits are configured to maintain respective target lists of sectors of the service coverage area in which respective ones of communication devices associated with the first communication device are estimated to be located.

The first communication device has a plurality of antennas, ones of the plurality of antennas being configured to transmit in particular sectors of the service coverage area. The one or more integrated circuits are configured to transmit the first PPDU using antennas of the plurality of antennas that are configured to directionally transmit in sectors of the target list of sectors that corresponds to the second communication device.

The one or more integrated circuits are configured to identify, at the first communication device, sectors in which the second communication device is estimated to be located and store the identified sectors in a target list that corresponds to the second communication device.

The one or more integrated circuits are configured to update the target list that corresponds to the second communication device based on a reception of a second PPDU having a non-null data portion.

The one or more integrated circuits are configured to identify the one or more sectors as busy when the first transmission is between a third communication device and a fourth communication device.

The one or more integrated circuits are configured to determine i) a first channel estimate of the WLAN communication channel between the first communication device and the third communication device, and ii) a second channel estimate of the WLAN communication channel between the first communication device and the fourth communication device, using measurements at the first communication device of a frame exchange between the third and fourth communication devices.

The one or more integrated circuits are configured to determine the first channel estimate and the second channel estimate using measurements at the first communication device of i) a request to send (RTS) frame transmitted by the third communication device to the fourth communication device, the RTS frame having a number of long training fields corresponding to a number of antennas of the third communication device, and ii) a clear to send (CTS) frame transmitted by the fourth communication device to the third communication device in response to the RTS frame, the CTS frame having a number of long training fields corresponding to a number of antennas of the fourth communication device.

The one or more integrated circuits are configured to transmit, by the first communication device, a request to the third communication device to perform the frame exchange between the third and fourth communication devices.

The one or more integrated circuits are configured to determine, at the first communication device, a precoder matrix for the second transmission as a null space of the first channel estimate and the second channel estimate, and generate the first PPDU using the precoder matrix.

The one or more integrated circuits are configured to determine, at the first communication device, a precoder matrix for the second transmission as a null space of a channel estimate that corresponds to a receiver of the first transmission; and generate the first PPDU using the precoder matrix.

The one or more integrated circuits are configured to generate the first PPDU to have an end time on or before an end of the first transmission.

The one or more integrated circuits are configured to determine i) a first channel estimate of the WLAN communication channel between the first communication device and the third communication device, and ii) a second channel estimate of the WLAN communication channel between the first communication device and the fourth communication device, using measurements at the third communication device of a first null data frame transmitted from the first communication device to the third communication device and using measurements at the fourth communication device of a second null data packet transmitted from the first communication device to the fourth communication device, wherein the first communication device and one of the third and fourth communication devices are access points.

The one or more integrated circuits are configured to identify a sector as busy when the first transmission is from the first communication device to a third communication device that is located in the sector.

The first transmission is a first single user transmission and transmitting the first PPDU to the second communication device is a second single user transmission.

The one or more integrated circuits are configured to identify a sector as busy when the first communication device is receiving the first transmission from a third communication device that is located in the sector.

The first communication device includes a directional antenna configured for transmission to a sector in which the second communication device is located and the one or more integrated circuits are configured to transmit the first PPDU using the directional antenna.

The first communication device includes a plurality of antennas configured for a single user beamforming transmission to a sector in which the second communication device is located and the one or more integrated circuits are configured to transmit the first PPDU as a single user beamforming transmission using the plurality of antennas.

The one or more integrated circuits are configured to divide, at the first communication device, the service coverage area into a plurality of sectors, and perform a separate carrier sense procedure for each sector of the plurality of sectors.

The first communication device comprises a plurality of antennas, and the one or more integrated circuits are configured to assign ones of the antennas to ones of the plurality of sectors.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for transmitting a physical layer (PHY) protocol data unit (PPDU) in a first wireless local area network (WLAN), the method comprising:
    determining, at a first communication device in the first WLAN, a channel estimate of a communication channel between the first communication device and a second communication device in a second WLAN using measurements at the first communication device of a first transmission between the second communication device and a third communication device in the second WLAN;
    generating, at the first communication device, the PPDU for transmission to a fourth communication device in the first WLAN, including:
        determining, using the channel estimate of the communication channel between the first communication device in the first WLAN and the second communication device in the second WLAN, a precoder matrix to use for transmitting the PPDU in the first WLAN, and
        generating the PPDU using the precoder matrix so that interference at the second communication device in the second WLAN caused by transmission of the PPDU by the first communication device in the first WLAN is reduced;
    determining, at the first communication device, that a first portion of a service coverage area of the first communication device is busy with a second transmission in the second WLAN to the second communication device;
    determining, at the first communication device, that the PPDU is to be transmitted to the fourth communication device in the first WLAN concurrently with the second transmission in the second WLAN; and
    transmitting, by the first communication device and concurrently with the second transmission in the second WLAN, the PPDU to the fourth communication device in the first WLAN as a directional third transmission.

2. The method of claim 1, wherein:
    the channel estimate is a first channel estimate;
    the communication channel between the first communication device and the second communication device is a first communication channel;
    the method further comprises determining, at the first communication device in the first WLAN, a second channel estimate of a second communication channel between the first communication device and the third communication device in the second WLAN using measurements at the first communication device of a fourth transmission between the second communication device and the third communication device in the second WLAN; and
    determining the precoder matrix comprises determining the precoder matrix further using the second channel estimate of the communication channel between the first communication device in the first WLAN and the third communication device in the second WLAN.

3. The method of claim 2, wherein determining the precoder matrix to use for transmitting the PPDU in the first WLAN comprises determining the precoder matrix to correspond to a null space of the first channel estimate and the second channel estimate.

4. The method of claim 1, wherein determining the precoder matrix to use for transmitting the PPDU in the first WLAN comprises determining the precoder matrix to correspond to a null space of the channel estimate of the communication channel between the first communication device and the second communication device in the second WLAN.

5. The method of claim 1, further comprising:
determining, at the first communication device, that the fourth communication device is located in a second portion of the service coverage area of the first communication device, the second portion of the service coverage area being distinct from the first portion of the service coverage area;
wherein determining that the PPDU is to be transmitted to the fourth communication device in the first WLAN concurrently with the second transmission in the second WLAN is based on determining that the fourth communication device is located in the second portion of the service coverage area that is distinct from the first portion of the service coverage area.

6. The method of claim 5, further comprising:
maintaining, at the first communication device, respective target lists of sectors of the service coverage area in which respective ones of communication devices in the first WLAN are estimated to be located; and
wherein determining that the fourth communication device is located in the second portion of the service coverage area comprises determining that the fourth communication device is located in the second portion of the service coverage using a target list corresponding to the fourth communication device.

7. The method of claim 6, wherein maintaining the respective target lists of sectors comprises identifying, at the first communication device, sectors in which the fourth communication device is estimated to be located and storing the identified sectors in the target list that corresponds to the fourth communication device.

8. The method of claim 6, wherein:
maintaining the respective target lists of sectors comprises updating the target list that corresponds to the fourth communication device based on a reception, at the first communication device, of a second PPDU from the fourth communication device.

9. The method of claim 1, wherein determining the channel estimate of the communication channel between the first communication device in the first WLAN and the second communication device in the second WLAN comprises:
determining the channel estimate using measurements at the first communication device of one of: i) a request to send (RTS) frame transmitted by the second communication device to the third communication device, the RTS frame having a number of long training fields corresponding to a number of antennas of the second communication device, and ii) a clear to send (CTS) frame transmitted by the second communication device to the third communication device in response to an RTS frame transmitted by the third communication device, the CTS frame having a number of long training fields corresponding to a number of antennas of the second communication device.

10. The method of claim 1, further comprising:
transmitting, by the first communication device, a request to one of i) the second communication device and ii) the third communication device, to prompt the first transmission between the second communication device and the third communication device in the second WLAN.

11. A first wireless communication device for communicating in a first wireless local area network (WLAN), comprising:
a wireless network interface having circuitry configured to:
determine a channel estimate of a communication channel between the first wireless communication device and a second wireless communication device in a second WLAN using measurements at the first wireless communication device of a first transmission between the second wireless communication device and a third wireless communication device in the second WLAN, and
generate a physical layer (PHY) protocol data unit (PPDU) for transmission to a fourth wireless communication device in the first WLAN, including:
determining, using the channel estimate of the communication channel between the first wireless communication device in the first WLAN and the second wireless communication device in the second WLAN, a precoder matrix to use for transmitting the PPDU in the first WLAN, and
generating the PPDU using the precoder matrix so that interference at the second wireless communication device in the second WLAN caused by transmission of the PPDU by the first wireless communication device in the first WLAN is reduced;
wherein the circuitry is further configured to:
determine that a first portion of a service coverage area of the first communication device is busy with a second transmission in the second WLAN to the second communication device,
determine that the PPDU is to be transmitted to the fourth communication device in the first WLAN concurrently with the second transmission in the second WLAN, and
control the wireless network interface to transmit, concurrently with the second transmission in the second WLAN, the PPDU to the fourth wireless communication device in the first WLAN as a directional third transmission.

12. The first wireless communication device of claim 11, wherein:
the channel estimate is a first channel estimate;
the communication channel between the first wireless communication device and the second wireless communication device is a first communication channel;
the circuitry is further configured to:
determine a second channel estimate of a second communication channel between the first wireless communication device and the third wireless communication device in the second WLAN using measurements at the first wireless communication device of a fourth transmission between the second wireless communication device and the third wireless communication device in the second WLAN, and
determine the precoder matrix further using the second channel estimate of the communication channel between the first wireless communication device in the first WLAN and the third wireless communication device in the second WLAN.

13. The first wireless communication device of claim 12, wherein the circuitry is configured to determine the precoder matrix to correspond to a null space of the first channel estimate and the second channel estimate.

14. The first wireless communication device of claim 11, wherein the circuitry is configured to determine the precoder matrix to correspond to a null space of the channel estimate of the communication channel between the first wireless communication device and the second wireless communication device in the second WLAN.

15. The first wireless communication device of claim 11, wherein the circuitry is further configured to:
    determine that the fourth wireless communication device is located in a second portion of the service coverage area of the first wireless communication device, the second portion of the service coverage area being distinct from the first portion of the service coverage area; and
    determine that the PPDU is to be transmitted to the fourth wireless communication device in the first WLAN concurrently with the second transmission in the second WLAN based on determining that the fourth wireless communication device is located in the second portion of the service coverage area that is distinct from the first portion of the service coverage area.

16. The first wireless communication device of claim 15, wherein the circuitry is further configured to:
    maintain respective target lists of sectors of the service coverage area in which respective ones of wireless communication devices in the first WLAN are estimated to be located; and
    determine that the fourth wireless communication device is located in the second portion of the service coverage using a target list corresponding to the fourth wireless communication device.

17. The first wireless communication device of claim 16, wherein the circuitry is further configured to identify sectors in which the fourth wireless communication device is estimated to be located and storing the identified sectors in the target list that corresponds to the fourth wireless communication device.

18. The first wireless communication device of claim 16, wherein:
    the PPDU is a first PPDU; and
    the circuitry is configured to update the target list that corresponds to the fourth wireless communication device based on a reception, at the first wireless communication device, of a second PPDU from the fourth wireless communication device.

19. The first wireless communication device of claim 11, wherein the circuitry is further configured to:
    determine the channel estimate using measurements at the first wireless communication device of one of: i) a request to send (RTS) frame transmitted by the second wireless communication device to the third wireless communication device, the RTS frame having a number of long training fields corresponding to a number of antennas of the second wireless communication device, and ii) a clear to send (CTS) frame transmitted by the second wireless communication device to the third wireless communication device in response to an RTS frame transmitted by the third wireless communication device, the CTS frame having a number of long training fields corresponding to a number of antennas of the second wireless communication device.

20. The first wireless communication device of claim 11, wherein the circuitry is further configured to:
    control the wireless network interface to transmit a request to one of i) the second wireless communication device and ii) the third wireless communication device, to prompt the first transmission between the second wireless communication device and the third wireless communication device in the second WLAN.

21. The first wireless communication device of claim 11, wherein wireless network interface comprises a plurality of transceivers configured to transmit the PPDU to the fourth wireless communication device in the first WLAN as the directional third transmission.

22. The first wireless communication device of claim 21, further comprising:
    a plurality of antennas coupled to the plurality of transceivers.

* * * * *